(12) United States Patent
Frenken et al.

(10) Patent No.: US 12,485,525 B2
(45) Date of Patent: Dec. 2, 2025

(54) HAND-HELD TOOL AND SHEATH PART FOR A HAND-HELD TOOL

(71) Applicant: GUSTAV KLAUKE GMBH, Remscheid (DE)

(72) Inventors: Egbert Frenken, Heinsberg (DE); Andreas Lehr, Neuss (DE); Richard Casey, Yatton (GB)

(73) Assignee: GUSTAV KLAUKE GMBH, Remscheid (DE)

( * ) Notice: Subject to any disclaimer, the term of this patent is extended or adjusted under 35 U.S.C. 154(b) by 1160 days.

(21) Appl. No.: 17/274,896

(22) PCT Filed: Sep. 4, 2019

(86) PCT No.: PCT/EP2019/073500
§ 371 (c)(1),
(2) Date: Mar. 10, 2021

(87) PCT Pub. No.: WO2020/053036
PCT Pub. Date: Mar. 19, 2020

(65) Prior Publication Data
US 2022/0055200 A1 Feb. 24, 2022

(30) Foreign Application Priority Data
Sep. 10, 2018 (DE) .................... 10 2018 122 021.9

(51) Int. Cl.
*B25F 5/02* (2006.01)
*B25G 1/10* (2006.01)

(52) U.S. Cl.
CPC ............... *B25F 5/02* (2013.01); *B25G 1/102* (2013.01)

(58) Field of Classification Search
CPC ......................................................... B25F 5/02
(Continued)

(56) References Cited

U.S. PATENT DOCUMENTS

| 3,189,069 A | 6/1965 | Stowell |
| 3,379,278 A | 4/1968 | Skowron |

(Continued)

FOREIGN PATENT DOCUMENTS

| GB | 2503579 A | 1/2014 |
| WO | 1999019947 A1 | 4/1999 |

(Continued)

OTHER PUBLICATIONS

International Search Report for International Application No. PCT/EP2019/073876 mailed Dec. 18, 2019, 5 pages.

(Continued)

*Primary Examiner* — Hadi Shakeri
(74) *Attorney, Agent, or Firm* — Klintworth & Rozenblat LLP

(57) ABSTRACT

A hand-held tool having an electromotive actuation is provided. The hand-held tool has a handle region and a working head. In the handle region, an actuating switch is provided, which is arranged for the application of manual force. The handle region including the actuating switch is sheathed with a flexible sheath part, which, starting from an end of the handle region that is facing away from the working head to beyond the handle region is formed without an opening. A sheath part for a hand-held tool is also provided.

20 Claims, 9 Drawing Sheets

(58) Field of Classification Search
USPC .......................................................... 81/489
See application file for complete search history.

(56) References Cited

U.S. PATENT DOCUMENTS

| | | | | |
|---|---|---|---|---|
| 6,155,354 | A * | 12/2000 | Pusateri | B25F 5/006 |
| | | | | 173/171 |
| 6,276,186 | B1 | 8/2001 | Frenken | |
| 6,350,124 | B1 * | 2/2002 | Wade | A61C 1/16 |
| | | | | 433/116 |
| 6,779,216 | B2 * | 8/2004 | Davies | A61C 17/22 |
| | | | | 15/22.1 |
| 7,703,547 | B2 * | 4/2010 | Manacorda | B25F 5/006 |
| | | | | 16/431 |
| 2001/0001339 | A1 | 5/2001 | Garrison et al. | |
| 2007/0180887 | A1 | 8/2007 | Frenken | |
| 2009/0133591 | A1 | 5/2009 | Frenken | |
| 2015/0151367 | A1 | 6/2015 | Frenken | |
| 2015/0196363 | A1 * | 7/2015 | Aman | A61B 17/1622 |
| | | | | 53/425 |
| 2015/0364889 | A1 | 12/2015 | Frenken | |

FOREIGN PATENT DOCUMENTS

| | | |
|---|---|---|
| WO | 20030084719 A2 | 10/2003 |
| WO | 20070141156 A1 | 12/2007 |
| WO | 20130189774 A1 | 12/2013 |
| WO | 20140108361 A1 | 7/2014 |

OTHER PUBLICATIONS

International Preliminary Report on Patentability for International Application No. PCT/EP2019/073876 mailed Jan. 25, 2021, 8 pages.
Written Opinion for International Application No. PCT/EP2019/073876 mailed Sep. 15, 2020, 8 pages.

* cited by examiner

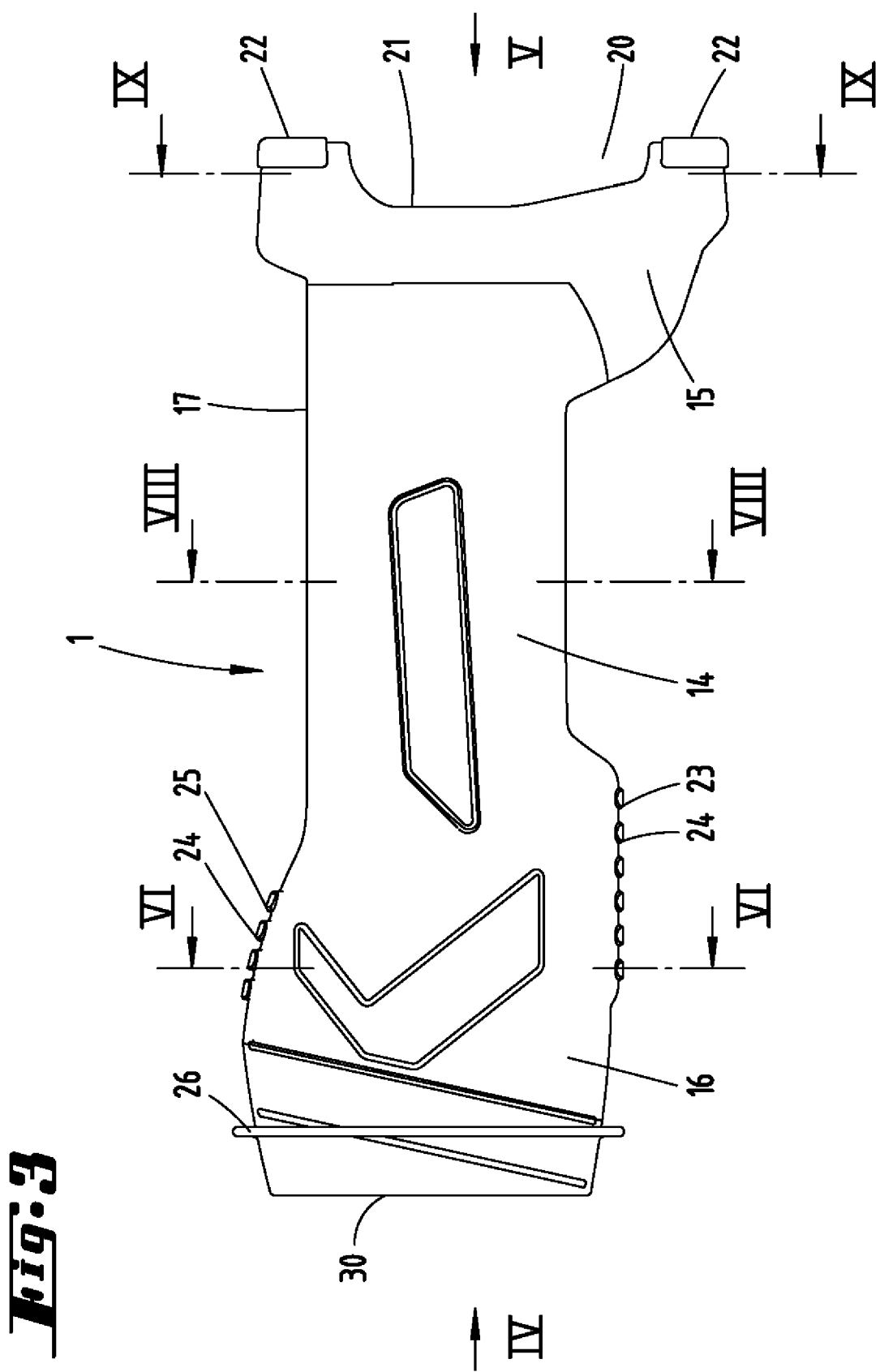

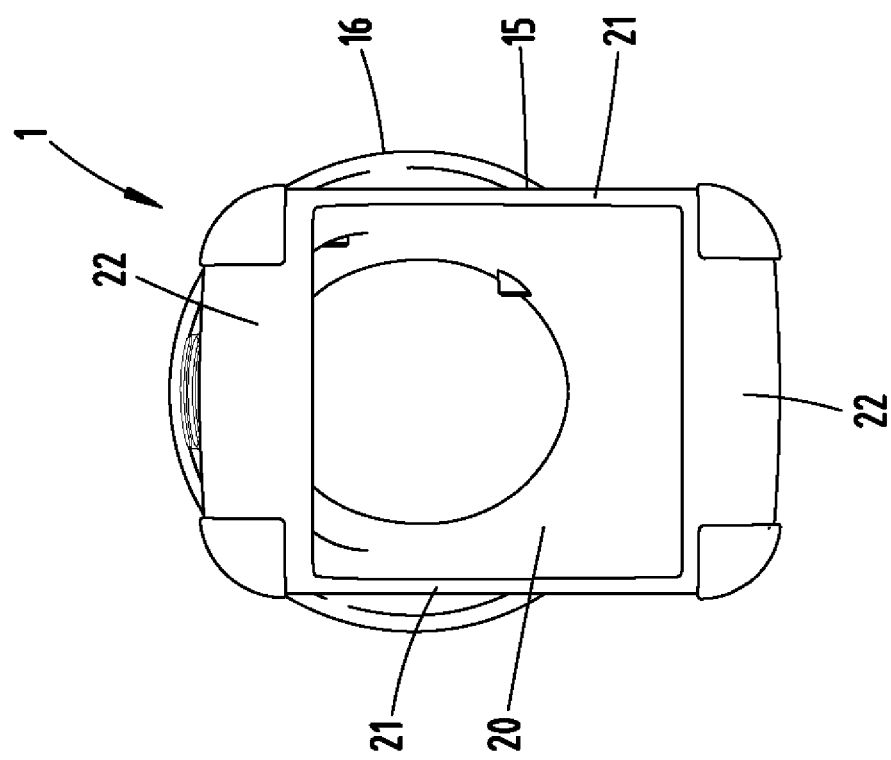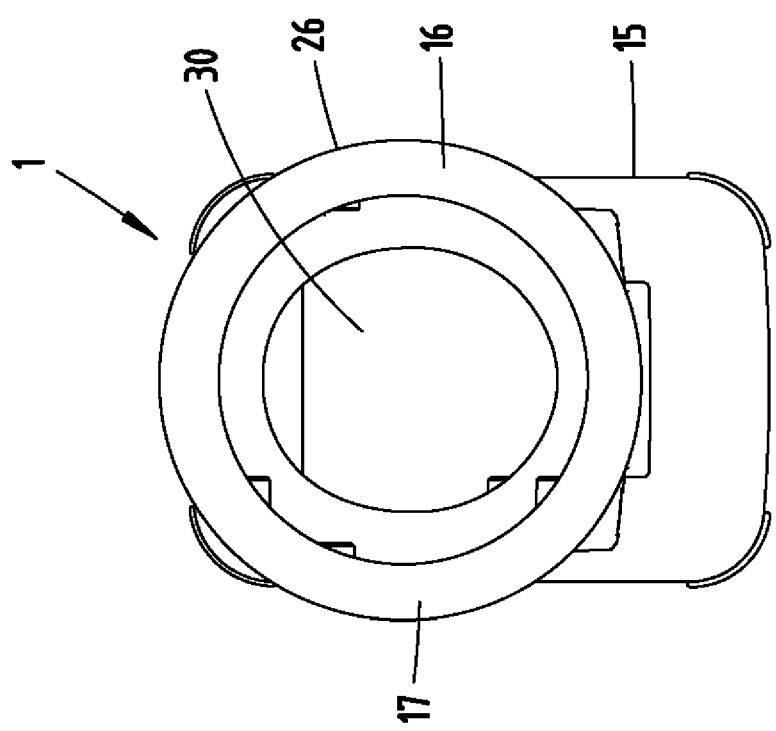

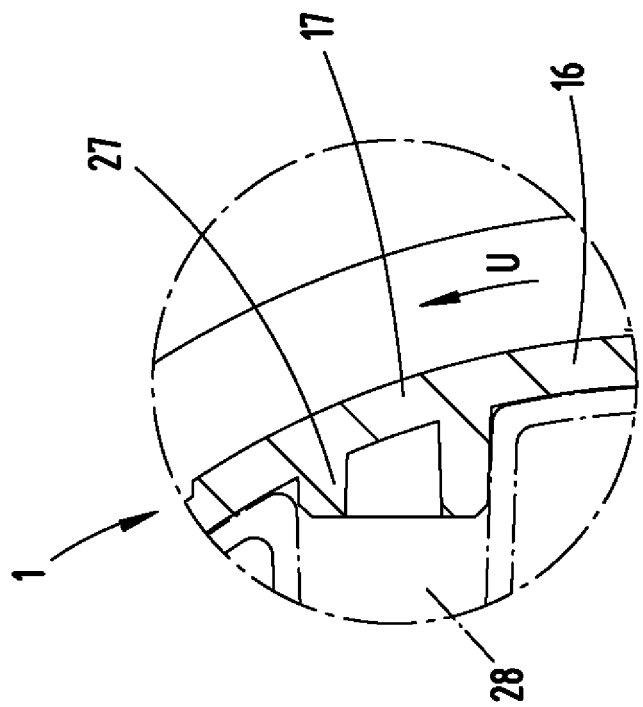
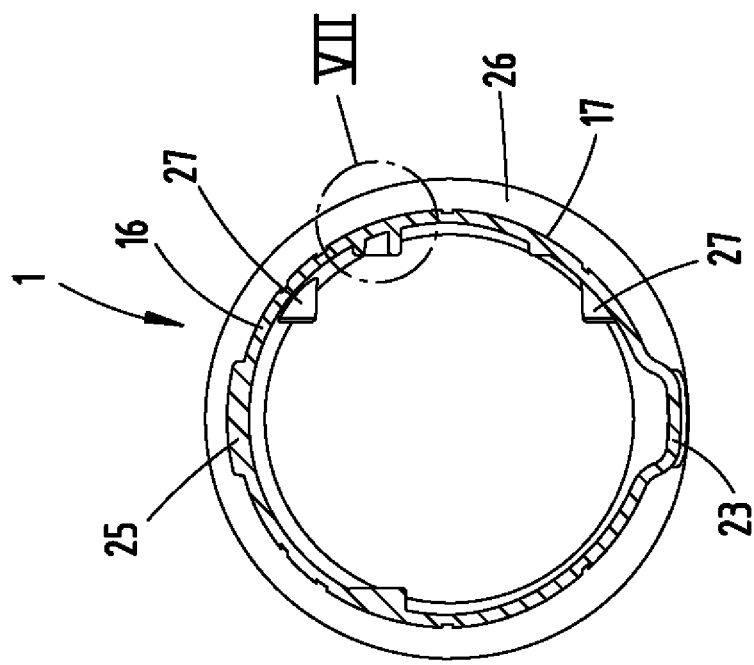

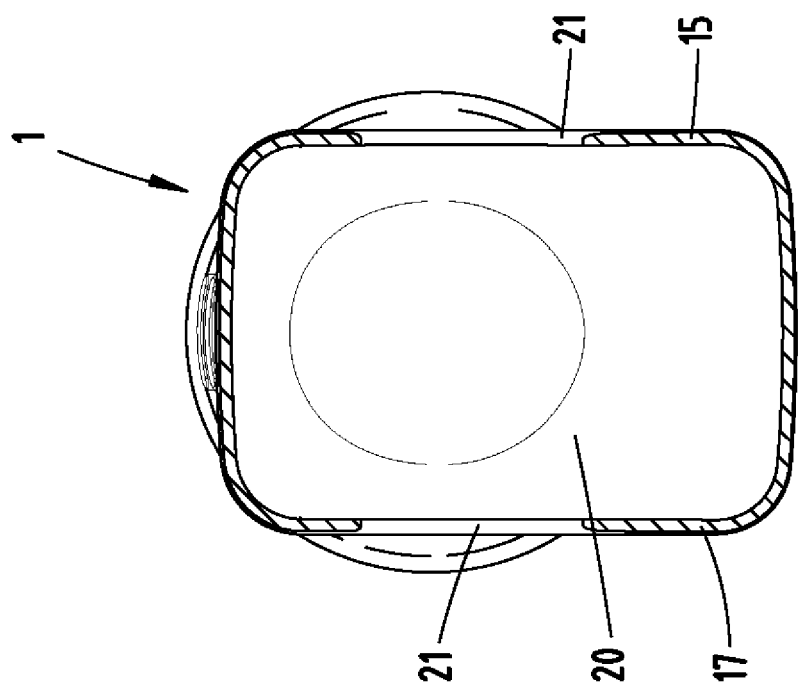
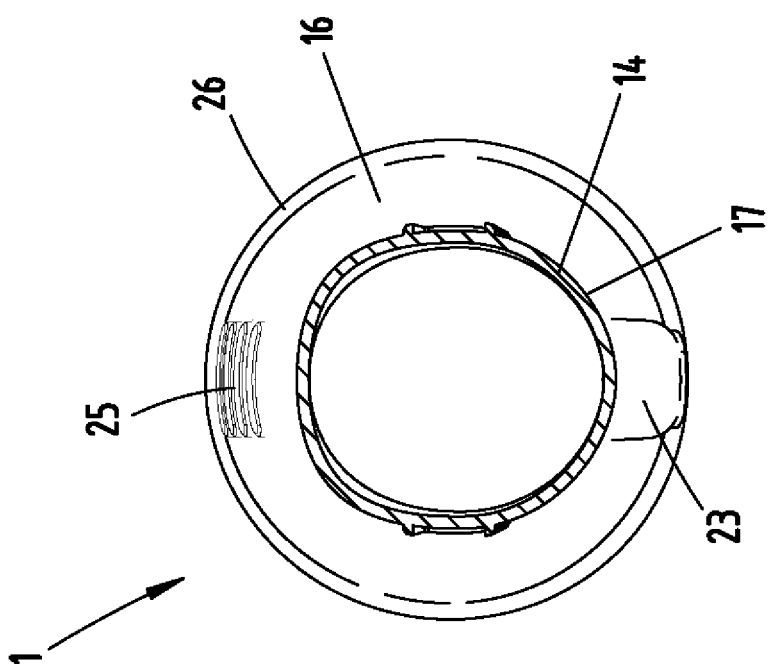

HAND-HELD TOOL AND SHEATH PART FOR A HAND-HELD TOOL

FIELD OF TECHNOLOGY

The invention relates to a hand-held tool comprising an electromotive actuation, wherein the hand-held tool has a handle region and a working head, and an actuating switch, which is arranged for being manually acted upon, is provided in the handle region.

The invention furthermore relates to a sheath part for a hand-held tool.

PRIOR ART

Hand-held tools of the type in question are known, for example, in the form of electromotive screwing or drilling tools, furthermore further also for example as crimping or pressing tools, or also, for example, as electromotively driven cutting or punching tools. These hand-held tools are hand-guided, wherein tools, which can be guided and operated with one hand, are further known in this respect.

Hand-held tools of this type have a handle region, which, when using the hand-held tool, can be seized or gripped, respectively, by the hand, which carries and preferably also actuates the hand-held tool. In ergonomically favorable arrangement, the actuating switch for the electric motor driving the tool is often provided in the handle region.

With regard to the prior art, reference is to be made for instance to the WO 2007/141156 A1 (US 2009/0133591 A1), WO 2013/189774 A1 (US 2015/0151367 A1), WO 2014/108361 A1 (US 2015/0364889 A1), WO 99/19947 A1 (U.S. Pat. No. 6,276,186 B1), and WO 03/084719 A2 (US 2007/0180887 A1). In particular with regard to the features known from these publications, the arrangement and formation of an actuating switch and/or of the housing and/or of the working head of such a device, the disclosure in this publication is hereby also incorporated into the present application.

The working head has the respective tool, thus for example a chuck for a screwing or drilling tool or further for example pivotable or displaceable working jaws in the case of pressing, punching, or cutting tools. It is further known in this context to be able to assign different working heads to the handle region. The working head can therefore be capable of thereby being assigned to the handle region in a replaceable manner.

During a use of hand-held tools of this type, there can be a danger based on the work environment. On the one hand, a penetration of unwanted foreign objects into the device can be feared based on a highly dusty or dirty work environment. On the other hand, there can also be a danger in particular when working on parts, which can be under electric high voltage.

It is known from GB 2 503 579 A to form a hand-held tool in a water-protected manner. For this purpose, a sheath is provided, which is formed by two rigid sections, one of which is assigned to the working head, and the other one is assigned to the accumulator region, and wherein the rigid sections are connected by means of a flexible sheath part, which extends at a distance to the tool. For a hand-held tool used in the medical field, a sheath is known from US 2015/196363 A1, which can consist of rigid sheath parts or which can be applied to the hand-held tool by means of a wrapping or by means of a shrinking process. A removable grip part for an ultrasonic probe is known from US 2001/001339 A1. The grip part can be spread apart in a longitudinal direction and is formed in a C-shaped manner in the cross section. On the inner side, the grip can have a recess, which can cooperate with a protrusion at the probe, which is to be gripped.

SUMMARY OF THE INVENTION

Based on the specified prior art, the invention deals with the task of upgrading a hand-held tool with respect to a use in an environment, which may pose a danger, and to provide a means, which is suitable for this purpose.

This task is initially solved in the case of the subject matter of claim 1, which focusses on that, facing the working head and viewed from an end of the handle region facing away from the working head, a rib, which protrudes outwards transversely to a longitudinal extension of the hand-held tool, is formed at the sheath part on the other side of the actuating switch.

The invention furthermore also proposes a sheath part for covering a handle region, including an actuating switch of a hand-held tool, wherein the sheath part is flexible and is formed in a tubular manner, comprising a respective end-side tube opening. With regard to the sheath part, the sheath part is flexible and is formed in a tubular or hose-like manner, comprising a respective end-side tube opening, that a rib, which protrudes circumferentially outwards transversely to a longitudinal extension, is formed at the sheath part as anti-slip protection, assigned to a first end, and that the rib, which protrudes freely beyond an outer surface of the sheath part, has a length, which corresponds to approximately ¼ to ½ of a distance measure of the rib to a free end of the sheath part facing the working head.

The sheath part comprises of a material, such as a thermoplastic elastomer, but optionally also of a rubber material. The sheath part can thereby extend over the entire or virtually the entire region of the handle region or via the virtually entire region, respectively, of a basic device having the handle region and supporting the working head, starting from the end of the handle region facing away from the working head to optionally the transition to the working head.

The sheath part is thereby formed to be closed over the entire longitudinal extension, in particular with regard to its circumferential outer surface, therefore preferably does not have any apertures or openings, through which in particular the handle region and/or the actuating switch could be partially exposed. According to a tubular design of the sheath part, frontal openings can be provided in the sheath part only on the end side in order to provide for the arrangement of the working head at the handle region, optionally also in the end region located opposite the working head. In the case of an elongated handle region, a corresponding opening surface extends transversely to a longitudinal axis of extension resulting thereby.

As a result of the sheath part, which circumferentially surrounds the handle region preferably completely and in a closed manner, a protective sheath is present for the hand-held tool, in particular a protective sheath for the handle region, optionally as a whole for the basic device having the handle region. In a possible design, the sheath part can be used to protect the hand-held tool, in particular the electromotive and optionally sensory elements, which are generally arranged in the region of the handle, furthermore also the actuating switch against dirt and/or moisture. With regard to electrically insulating characteristics of the sheath part and of the sheath part material, which are also preferably formed thereby, the arrangement of such a sheath part turns out to be particularly advantageous. When the sheath part is arranged, the hand-held tool as a whole is thus suitable for performing work on voltage-conducting parts.

Due to the arrangement according to the invention of the sheath part, the actuating switch is actuated solely via a sheath part section covering the switch. Due to the flexible characteristics of the sheath part material, the corresponding sheath part section can yield when actuating the switch.

An electrical insulation, which acts at least up to 1,000 VAC (volts of alternating current) or 1,500 VDC (volts of direct current), is preferably at hand by means of the sheath part, furthermore preferably of up to 10,000 VAC and more.

Such a hand-held tool comprising a sheath part surrounding in particular the handle region preferably corresponds to the international standard IEC 60900 (DIN EN 60900).

Viewed individually, thus as loose part, which is not yet assigned to the hand-held tool, the sheath part is be shape-adapted to the shape of the handle region to be gripped or basic device of the hand-held tool, respectively. In the alternative, in particular the material selection, but furthermore also the material thickness of the sheath part can be selected so that the shaping is established only with a covering of the sheath part, for example over the handle region, as a result of the flexible characteristics of the sheath part material.

In a possible design, the sheath part, once it has been mounted, can furthermore be provided so as to no longer be operationally releasable from the hand-held tool. This refers in particular to the conventional use of the hand-held tool, so that it is ensured that the sheath part does not release from the assigned handle region as part of the conventional use of the hand-held tool. For example, an adhesion can be carried out for this purpose between an inner surface of the sheath part and an outer surface of a housing of the hand-held tool, or the sheath part can be mounted so "tightly" that it cannot be removed by a user without aids, optionally not without destruction. A design is preferred, in the case of which the user can arrange the sheath part, if required, at the hand-held tool or at the handle region, respectively, or can deliberately remove it therefrom, respectively. As a further alternative, the sheath part can also already be mounted over the handle region on the part of the manufacturer, whereafter a removal of the sheath part from the handle region is preferably no longer possible, at least no longer without destruction.

The sheath part can represent a closed cover with respect to a housing, which is formed under the sheath part and which preferably consists of plastic hard parts. The sheath part can therefore simultaneously provide protection for the housing against external damage in this way. As a result of the arrangement of the sheath part, a hand-tool, which is usually not high voltage-insulated, is furthermore electrically insulated according to the above-described standard.

Facing the working head and with respect to the end of the handle region facing away from the working head and with respect to the end of the handle region facing away from the working head, a rib, which protrudes outwards transversely to a longitudinal extension of the hand-held tool, can be formed at the sheath part on the other side of the actuating switch. When using the hand-held tool, the rib is arranged between the working head and the hand, which guides and actuates the hand-held tool, and thus provides an anti-slip protection at the sheath part, in order to prevent a slipping of the hand towards working head, which is not insulated or at least not insulated by the sheath part, and which is thus optionally live.

A favorable handling of the hand-held tool, which is provided with the sheath part in the handle region, can further provided by means of a corresponding surface quality of the sheath part in the immediate grip region.

On its end facing away from the working head, the hand-held tool can also have an accumulator, which is provided for replacement purposes. The electric motor driving the hand-held tool can, and preferably, be fed via such an accumulator, and furthermore electronic elements, which are further optionally provided. To charge the accumulator, it is known to release the latter from the hand-held tool, in particular from the handle region, and to bring it to a charging station. In the case of such an accumulator arrangement, the sheath part can have an opening in the manner of a tube opening, assigned to a bottom surface of the accumulator facing away from the working head, in order to provide for an exposure of the accumulator in the interest of replaceability. In a possible design, the accumulator can be removed through this opening or can be attached to the hand-held tool, respectively.

Viewed in the longitudinal extension of the sheath part, openings of this type can in each case also be provided on the end side.

The opening thereby has an opening surface, which permits the removal or the assignment, respectively, of the accumulator, wherein the opening surface is preferably directed transversely to a longitudinal extension of the handle region.

For this purpose, the sheath part can further have base regions, which are formed for partially engaging under the accumulator. According to a possible design, these base regions can extend solely in possible corner regions of the sheath part section surrounding the accumulator, but optionally also over small regions, which connect two corner regions, between which small regions the opening is left. In a possible design, the base regions can, for example, be folded to the side or rolled up in order to replace or remove, respectively, the accumulator, based on the flexible characteristics of the sheath part material.

In a possible design, the sheath part can be held solely by friction as a result of the flexible material characteristics, and optionally by means of a positive connection as a result of the outer shaping of the handle region and of the abutting sheath part.

The sheath part can furthermore have a protrusion on the inner side of a sheath part wall, for the positive engagement with a recess of the handle region or of the basic device having the handle region, respectively. In this respect, several protrusions of this type, which cooperate with corresponding recesses in the handle region, can be provided on the sheath part side.

According to a preferred design, the protrusions can extend transversely to a mounting direction of the sheath part on the handle region, so that positive connections, which act transversely to a possible displacement direction of the sheath part and preferably additionally in the circumferential direction, result as a result of engagement of these protrusions with the recesses on the handle region side.

The protrusion of the sheath part can be designed in a journal-like manner, for example for the engagement with housing-side bore-like depressions, in which for example screw heads can be received for the closure of the housing.

The sheath part-side protrusion can, and preferably, be formed in one piece with the sheath part wall. A formation of the protrusion of the same material as the sheath part wall, further preferably a formation in one-piece as well as of the same material, can furthermore be provided.

The sheath part can be made, for example, in a plastic injection molding process. The sheath part can also be made as rubber part by means of vulcanizing. A multi-component injection molding can also be at hand in this respect, for example for offering an easy-to-grip surface in the immediate handle region and/or in the sheath part section formed for actuating the switch and/or for forming target elongation regions in order to provide for a covering or removing of the sheath part to or from the hand-held tool, respectively.

BRIEF DESCRIPTION OF THE DRAWINGS

The invention is described in more detail below on the basis of the enclosed drawing, which only illustrates an exemplary embodiment, in which:

FIG. 3 shows the sheath part in a side view;

FIG. 4 shows the front view against the sheath part according to the arrow IV in FIG. 3;

FIG. 5 shows the view according to arrow V in FIG. 3 against a bottom region of the sheath part;

FIG. 6 shows the section according to the line VI-VI in FIG. 3;

FIG. 7 shows the enlargement of the region VII in FIG. 6;

FIG. 8 shows the section according to the line VIII-VIII in FIG. 3;

FIG. 9 shows the section according to the line IX-IX in FIG. 3;

DESCRIPTION OF THE EMBODIMENTS

Figure 1:
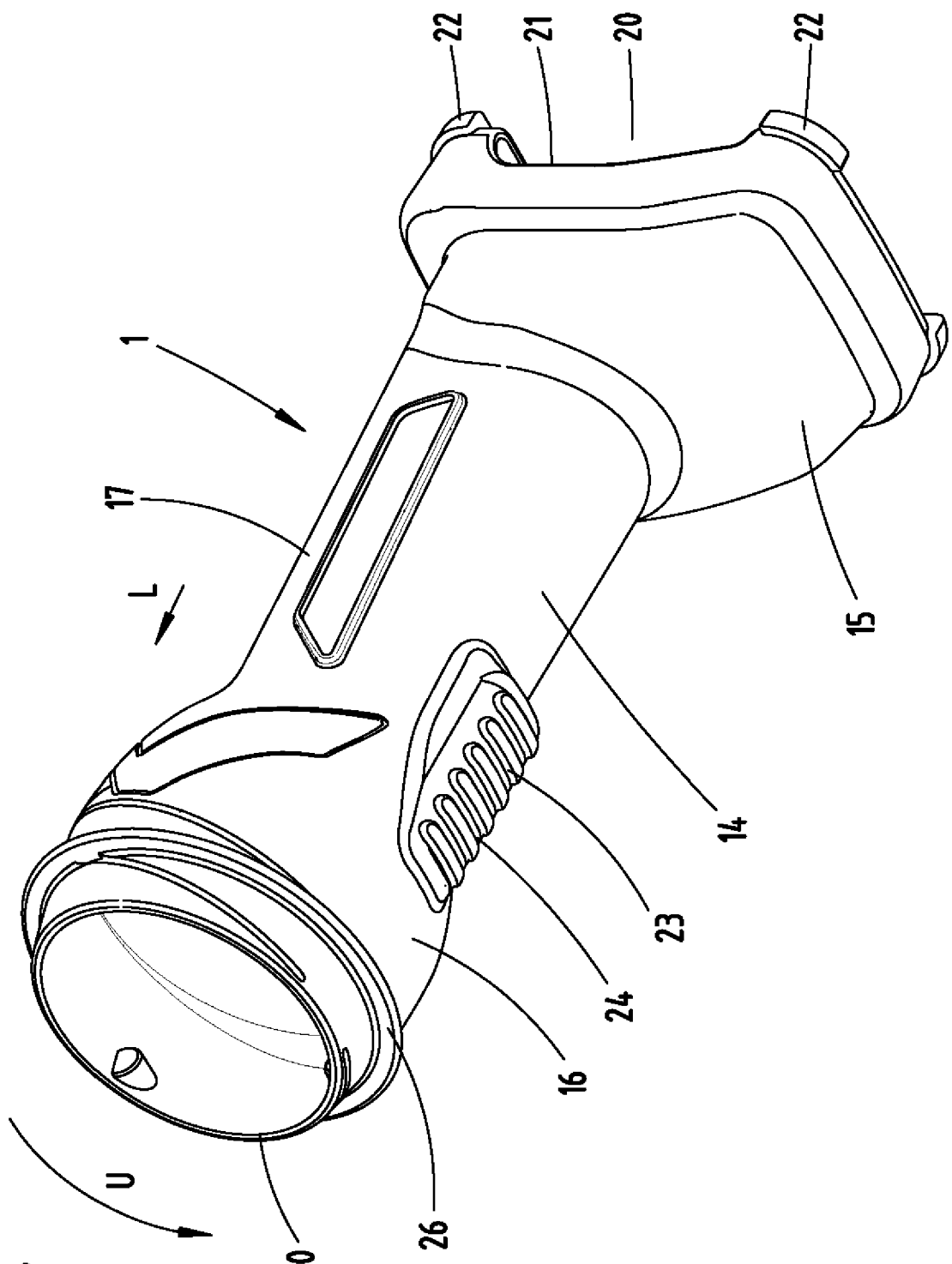
FIG. 1 shows a sheath part for the arrangement in a hand-held tool in perspective illustration.
Figure 2:
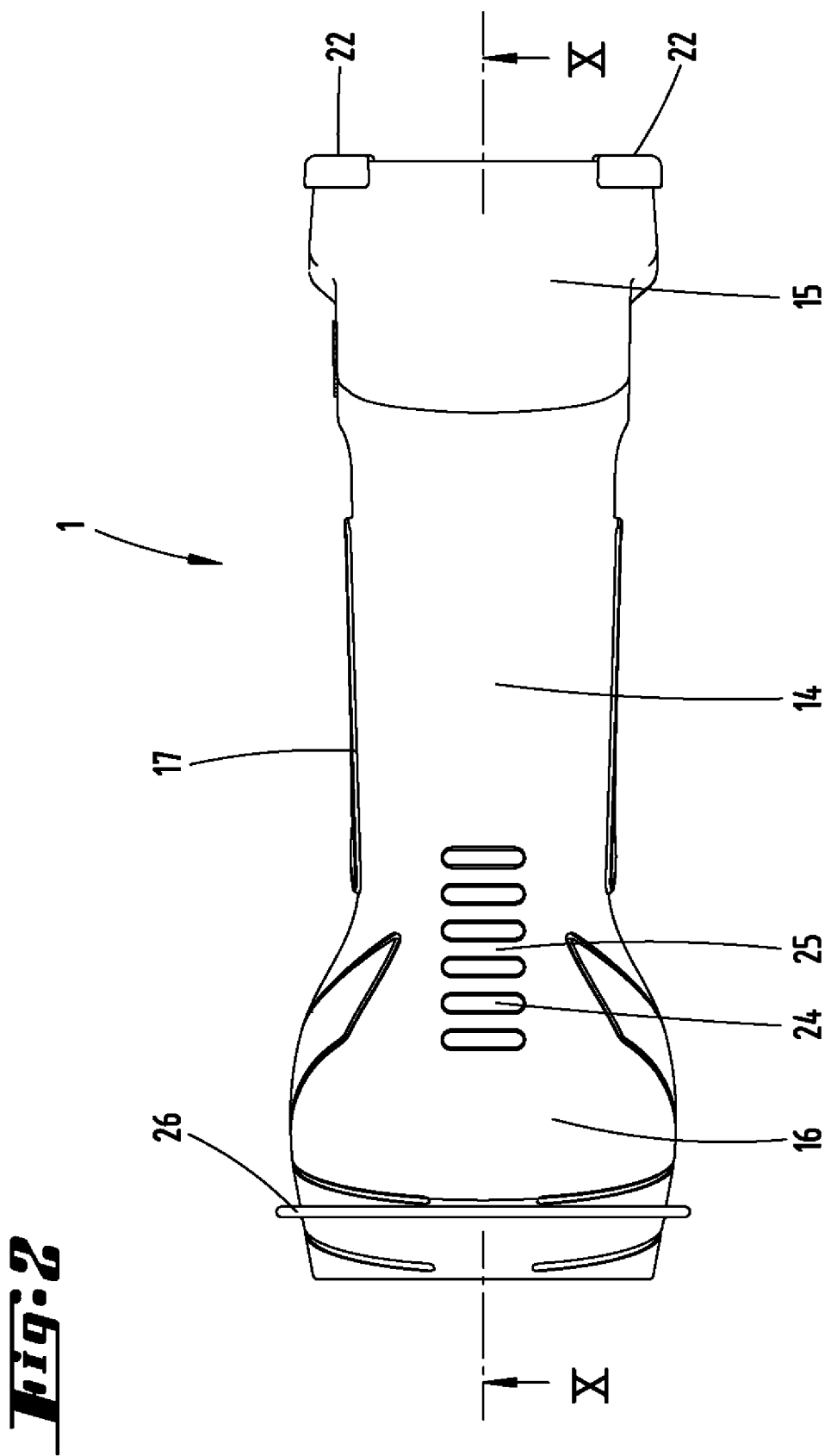
FIG. 2 shows the sheath part in a top view.
Figure 10:
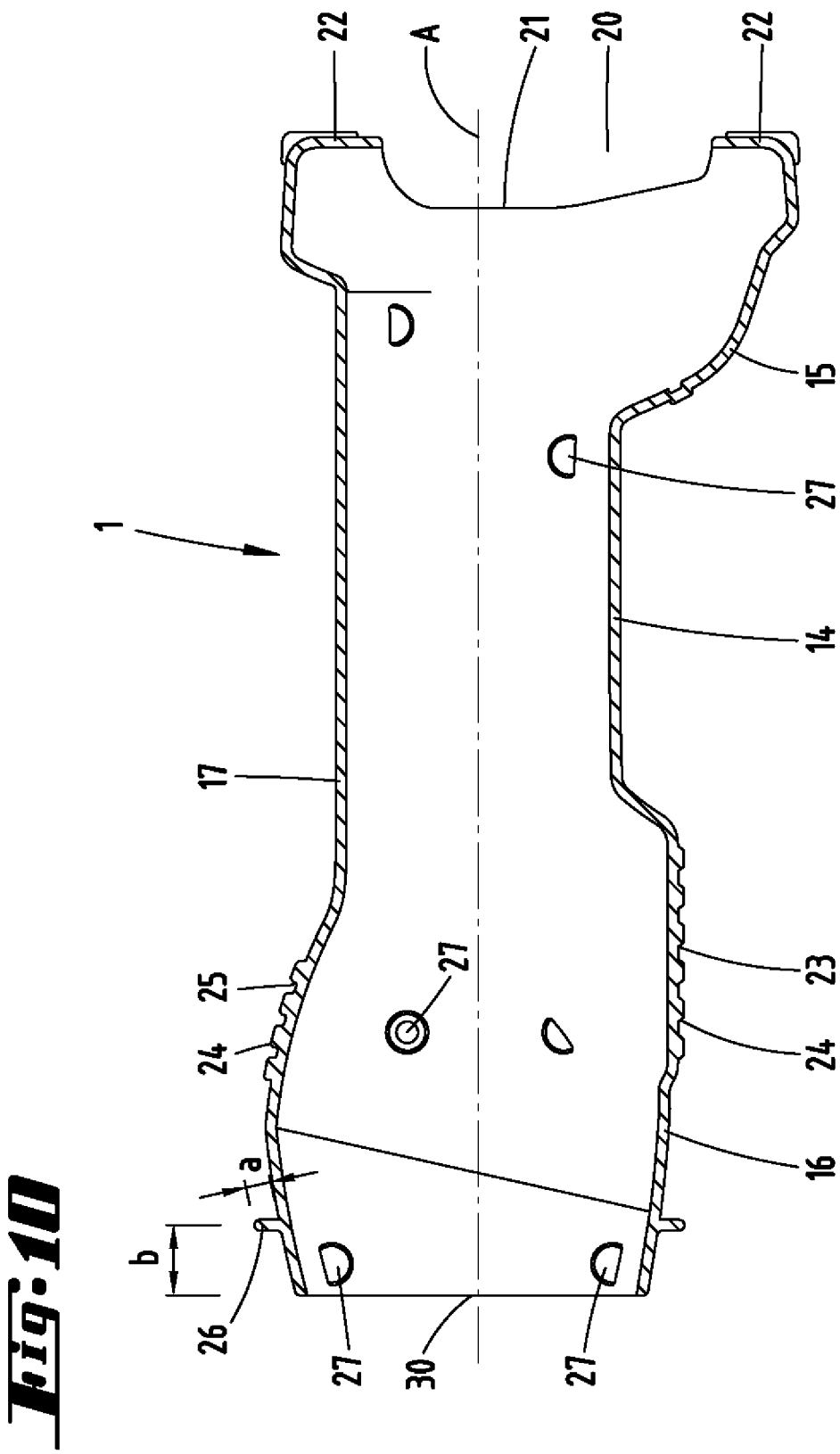
FIG. 10 shows the longitudinal section through the sheath part according to the line X-X in FIG. 2.

What is illustrated and described, first of all with reference to FIG. 1, is a sheath part 1 for arrangement at a hand-held tool 2.

Figure 11:
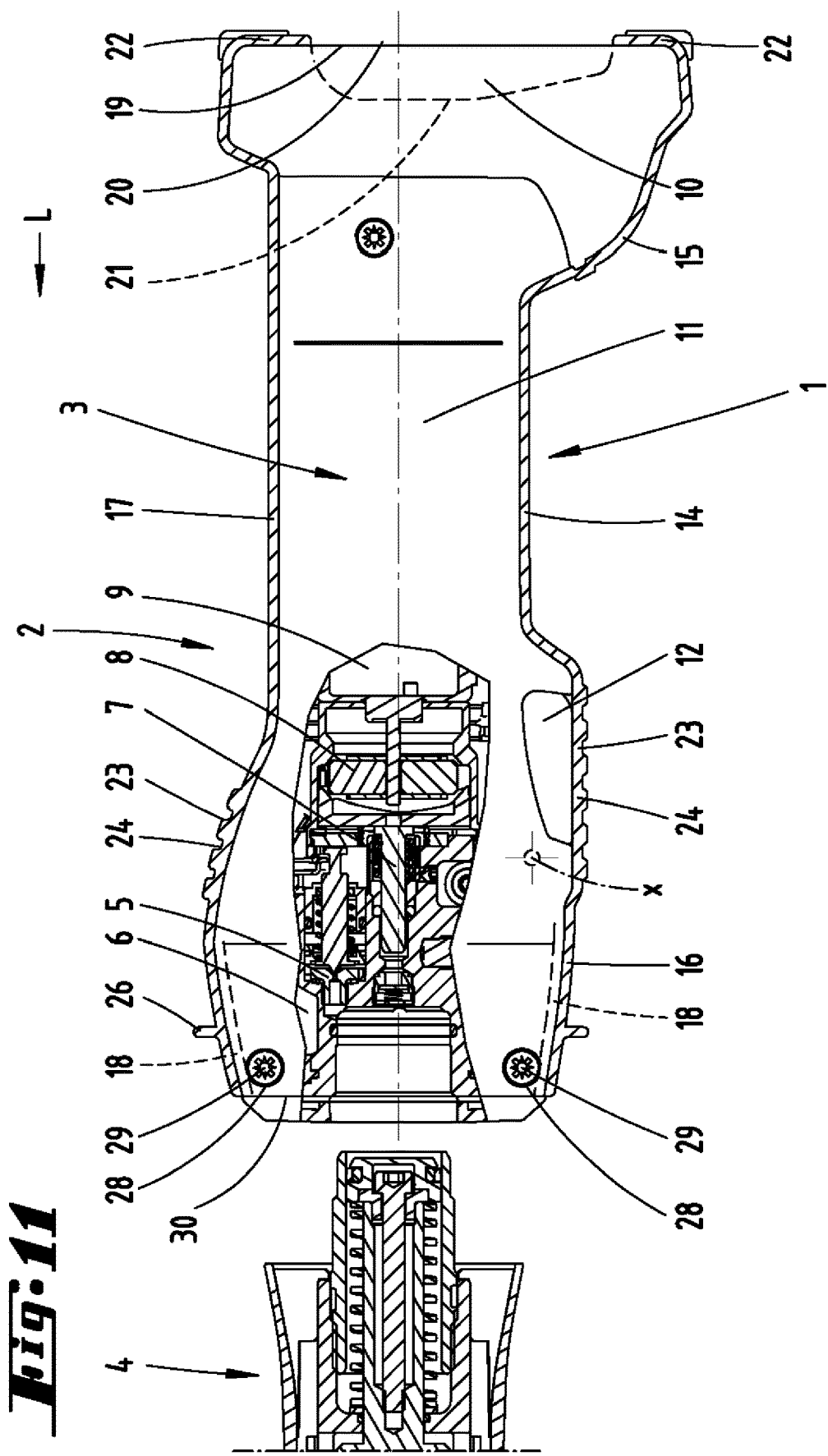
FIG. 11 shows the sheath part in a longitudinal sectional illustration according to FIG. 10 in an assigned position by gripping a handle region of a hand-held tool, wherein the hand-held tool is illustrated in a partially cut manner.
Figure 12:
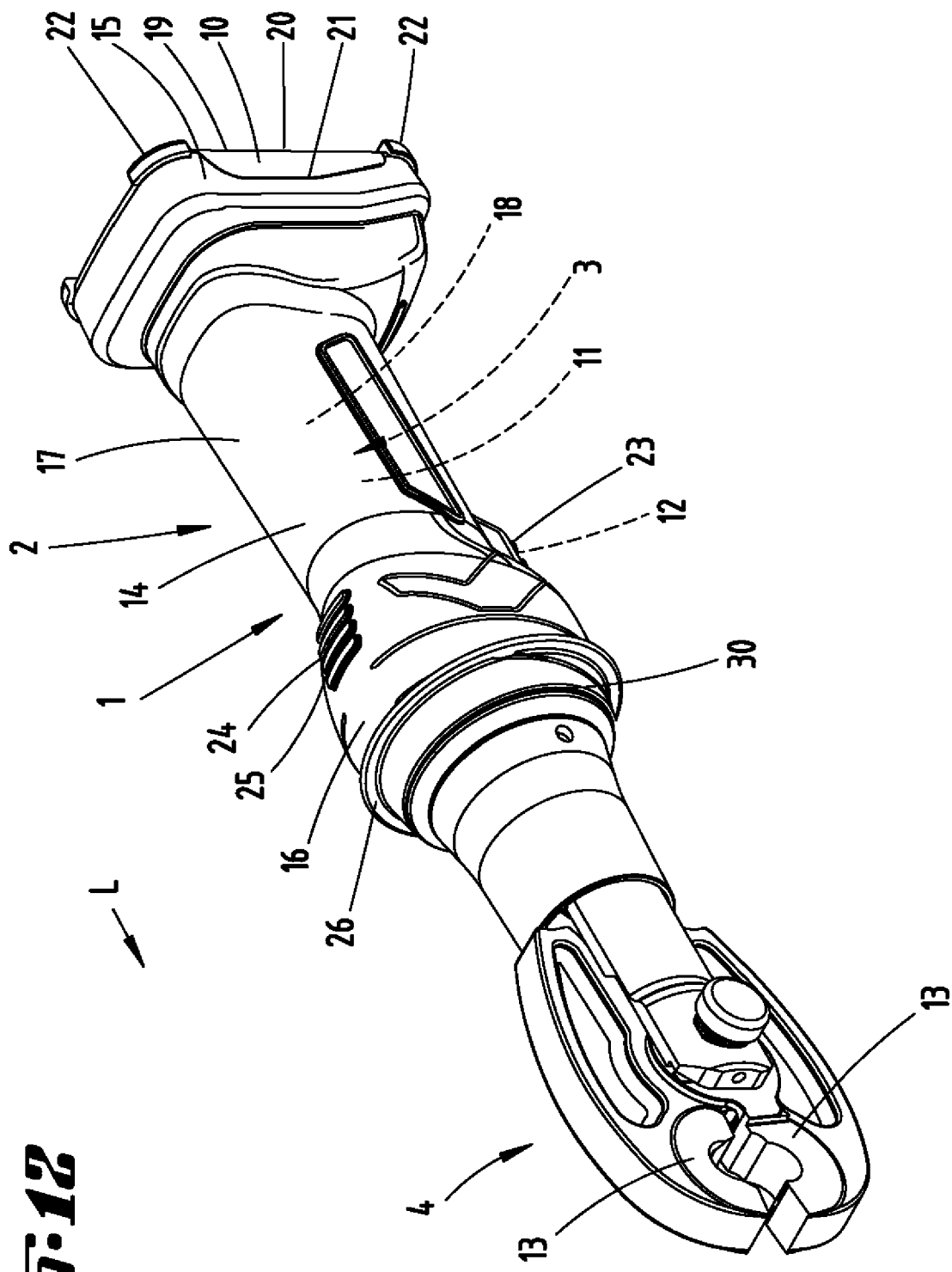
FIG. 12 shows the hand-held tool with arranged sheath part in perspective illustration.

The hand-held tool is illustrated in FIGS. 11 and 12, here in the form of an electro-hydraulically actuatable pressing device in rod-like design. FIG. 12 shows the hand-held tool 2, which is covered with sheath part 1.

The hand-held tool 2 can be formed in an essentially elongated rod-shaped manner, which supports a one-hand operation of the hand-held tool 2. Such a rod-shaped device is known, for example, from the above-mentioned WO 03/084719 A2.

The hand-held tool 2 is essentially divided into a basic device 3, which has a handle region 11, and a working head 4, which can optionally be released from the basic device 3.

With regard to the illustration in FIG. 11, the connection with the subject matter described in the mentioned WO 03/084719 A2 can be seen in the region of the hand-held tool 2, which is cut out in the drawing, for instance with regard to a return valve 5, a tank 6, and a pumping plunger 7. It can also be seen as a whole in this context that a hydraulic medium pump 8 and an electric motor 9 for the hydraulic medium pump 8 are provided in serial arrangement. The electrical supply in particular of the electric motor 9, but furthermore also of a non-illustrated control unit, and of further electronic components in the hand-held tool 2, in particular in the basic device 3 is provided by the arrangement of an accumulator 10, which is arranged on the base side of the handle region 11.

The accumulator 10 is provided for replacement purposes, thus is releasably plug-held at the handle region 11 on the base side.

The handle region 11 is further formed for the conventional gripping by means of one hand. In an ergonomically favorable manner, an actuating switch 12 is provided, assigned to the handle region 11.

The illustrated working head 4 is only exemplary. It can preferably be replaced, as it is suggested in FIG. 11. What is shown is a working head 4, having two pivotable clamping jaws 13. In the alternative, cutting edges or other tools, which can be operated via the hydraulic system, can also be arranged on the working head side.

The sheath part 1 consists of a flexible material, for example of a thermoplastic elastomer or of a rubber material. The sheath part 1 is furthermore formed in a tubular or hose-like manner, in particular shape-adapted to the outer contour of the hand-held tool 2 in the region of the rod-like basic device 3.

With reference to a longitudinal extension L (see for instance FIG. 12) in particular of the basic device 3 comprising its handle region 11, the sheath part 1, in line with the basic device 3, has essentially three regions, which are provided one behind the other in the longitudinal extension L and along a longitudinally extending axis A, which, in the covered state with respect to the hand-held tool 2, generally corresponds to a longitudinal axis of the hand-held tool 2, thus initially a central, waist-like grip sheath region 14 with an at least approximately circular cross section (see FIG. 8), which is adjoined on the base side by an accumulator sheath region 15. The latter has, transversely to the longitudinal extension L in the region directly encompassing the accumulator 10, an essentially elongated rectangular cross section according to the illustration in FIG. 9. With respect to an essentially cylindrical section of the sheath part 1, as it is provided for instance by the grip sheath region 14 in the exemplary embodiment, the longitudinally extending axis A penetrates the sheath part 1 in the center, in line with a cylinder axis in this respect.

Located opposite to the accumulator sheath region 15, a drive sheath region 16 adjoins the grip sheath region 14, comprising an essentially circular cross sectional surface according to the illustration in FIG. 6, wherein the drive sheath region 16 is formed with an enlarged diameter with respect to the grip sheath region 14. In a cross section transversely to the longitudinal extension L, the accumulator sheath region 15 also exceeds the cross section in the grip sheath region 14. The overall waist-like design of the grip sheath region 14 results from this.

Starting from a bottom surface 19 of the accumulator 10 facing to the outside, therefore away from the working head 4, the sheath part wall 17 encompassing the housing 18 of the basic device 3, in particular of the handle region 11, which preferably consists of plastic hard parts, extends in the longitudinal extension L to beyond an actuating switch 12, which is provided on the device side in the transition region from the grip sheath region 14 into the drive sheath region 16, all the way to the end of the basic device 3 assigned to the working head 4. Viewed over the longitudinal extension L, the sheath part 1 is thereby completely closed circumferentially. In the case of at least approximately consistently identical material thickness of, for example, 2 mm or 3 mm, up to 5 mm or more, the sheath part wall 17 can furthermore, and as is illustrated, abut against the outer surface of the housing 18 as well as of the accumulator 10 completely and so as to take on the contour.

Frontally, i.e. on the working head side and facing away from the accumulator 10, viewed in the longitudinal extension L, an opening, which is directed essentially transversely to the longitudinal extension L, can be provided in the sheath part 1, assigned to the connecting plane, for the connection of the working head 4 to the basic device 3.

Facing away from the working head 4, an opening 20 in the manner of a tube opening, is furthermore provided on the base side and assigned to the bottom surface 19 of the accumulator 10, via which opening 20 an exposure of the accumulator 10 is made possible. As follows, for example, from FIG. 5, the opening 20 can have an essentially rectangular opening surface, which is oriented transversely to the longitudinal extension L, wherein the opening 20 widens further into sheath wall-side grip cut-outs 21 in the region between two edge sections located opposite one another. These grip cut-outs 21 provide for an opposite, lateral seizing of the accumulator 10 for the purpose of the removal from the handle region 11 or for the purpose of the assignment, respectively.

A further end-side tube opening (opening 30), through which the interface region between the working head 4 and the basic device 3 is accessible, is provided in the direction of the longitudinal extension L located opposite to the opening 20.

Assigned to the accumulator sheath region 15, the sheath part 1 can have base regions 22, which are formed for partially engaging below the accumulator 10 in the region of the bottom surface 19 thereof. The base regions 22 flank the above-described opening 20, wherein the base regions 22 can thereby connect two corner regions of the accumulator sheath region 15, which are located opposite one another.

According to the illustration in FIG. 5, strip-like base regions 22 thus result, which partially engage below the accumulator 10 in the use position of the hand-held tool 2.

To remove the accumulator 10, the base regions 22 can, for example, be folded to the side or rolled up, respectively, based on the flexible design of the sheath part material.

As can further in particular be seen from the illustration in FIG. 11, the sheath material or the sheath part wall 17, respectively, also extends over the actuating switch 12. The latter is therefore also completely covered with the sheath part 1. The actuation of the actuating switch 12 takes place through the sheath part wall 17 as a result of pressure application. The flexible material selection of the sheath part wall 17 provides for this transfer.

The actuating switch 12 can, and preferably, be a mechanical switch, which can be pivoted around an axis x transversely to the longitudinal extension L.

The switch section 23 in the drive sheath region 16, which is partially raised with respect to the surrounding region of the drive or grip sheath region 14, 16, respectively, can be provided with a rib-like surface structuring 24, such as optionally also, as further illustrated in an exemplary manner in FIG. 11, a section 25 located on the opposite side in the drive sheath region 16 for resting in particular the thumb of the hand guiding and operating the hand-held tool 2.

A rib 26, which protrudes circumferentially transversely to the longitudinal extension L, is integrally molded on the outer wall side between the switch section 23 and the end of the sheath part 1 facing the working head 4. Said rib serves as anti-slip protection for the hand carrying the hand-held tool in the direction of the working head 4, is optionally not electrically insulated. The rib 26, which protrudes freely over the outer surface of the sheath part 1 with respect to a cross section according to FIG. 11, can thereby have a length a, which can correspond to approximately ¼ to ½, further for example to approximately ⅓ of the distance measure b of the rib 26 to the free end of the sheath part 1 facing the working head 4. The rib 26 preferably extends radially to the longitudinally extending axis A and is further preferably interspersed with a plane, which runs at a right angle to the longitudinally extending axis A.

In addition to a possible frictional connection between sheath part 1 and housing 18, and the positive connection resulting in the grip sheath region 14, for example, as a result of the waist-like design, the sheath part 1 can furthermore optionally have at least one further positive connection to the basic device 3, which acts transversely to the longitudinal extension L and preferably additionally in the circumferential direction. For this purpose, the sheath part 1 can have a protrusion 27 in one piece and of the same material on the inner wall side (see FIGS. 6 and 7). An approximately sleeve-shaped protrusion 27 is illustrated in FIG. 7 for positive engagement with a bore-like recess 28 in the basic device 3, in particular in the housing 18 thereof. This recess region is illustrated in FIG. 7 in a dash-dotted line type.

The recess 28 serves in the usual way for receiving a screw head 29, via which screw parts of the housing 18 are connected to one another.

As a result of this positive connection between protrusion 27 and recess 28, a protection against detachment of the sheath part 1 opposite to or in the covering direction, which is directed in the longitudinal extension L, is provided, as well as a protection against rotation in the circumferential direction U.

For mounting onto the hand-held tool, the sheath part can be present, for example, in rolled-up form, so that it can be pulled over by unrolling. In the same way, it can be provided that the sheath part can be removed from the hand-held tool again by means of rolling up.

LIST OF REFERENCE NUMERALS

| | | | |
|---|---|---|---|
| 1 | sheath part | 28 | recess |
| 2 | hand-held tool | 29 | screw head |
| 3 | basic device | 30 | opening |
| 4 | working head | | |
| 5 | return valve | | |
| 6 | tank | a | length |
| 7 | pumping plunger | b | distance measure |
| 8 | hydraulic medium pump | x | axis |
| 9 | electric motor | | |
| 10 | accumulator | L | longitudinal extension |
| 11 | handle region | U | circumferential direction |
| 12 | actuating switch | A | longitudinally extending axis |
| 13 | clamping jaw | | |
| 14 | grip sheath region | | |
| 15 | accumulator sheath region | | |
| 16 | drive sheath region | | |
| 17 | sheath part wall | | |
| 18 | housing | | |
| 19 | bottom surface | | |
| 20 | opening | | |
| 21 | grip cut-out | | |
| 22 | base region | | |
| 23 | switch section | | |
| 24 | surface structuring | | |
| 25 | section | | |
| 26 | rib | | |
| 27 | protrusion | | |

The invention claimed is:

1. A hand-held tool configured to be actuated by electromotive actuation has comprising:
   a handle region having a first end and a second end defining a longitudinal axis, the handle region being configured to be gripped by a user;
   a working head at the first end of the handle region;
   an actuating switch provided in the handle region, the actuating switch being configured to be manually acted upon by the user; and
   a flexible sheath part having first and second ends and including a sheath part wall and a rib, the flexible sheath part covering the handle region and the actuating switch starting from the second end to beyond the handle region, the sheath part wall being formed without an opening between its first and second ends, and the rib protruding outward from the sheath part wall transverse to the longitudinal axis and between the first end and the actuating switch, wherein the sheath part is formed of a flexible material formed in a tubular manner having an outer surface and the rib protrudes circumferentially outwards transversely to a longitudinal extension of the sheath part, the rib being formed as anti-slip protection at the first end, the rib protruding freely beyond the outer surface, and the rib having a length which corresponds to approximately ¼ to ½ of a distance measure of the rib to the first end of the sheath part.

2. The hand-held tool according to claim 1, wherein the handle region forms part of a housing formed of plastic hard parts and the flexible sheath part provides a closed cover for the housing.

3. The hand-held tool according to claim 2, further comprising an accumulator on the second end of the handle region, the accumulator having a bottom surface, and the flexible sheath part including an accumulator sheath region extending from the sheath part wall and having a bottom opening, the accumulator sheath region covering the accumulator except for the opening which exposes the bottom surface of the accumulator.

4. The hand-held tool according to claim 3, wherein the flexible sheath part further comprises base regions extending from the accumulator sheath region and configured to partially engaging under the accumulator.

5. The hand-held tool according to claim 1, further comprising an accumulator on the second end of the handle region, the accumulator having a bottom surface, and the flexible sheath part including an accumulator sheath region extending from the sheath part wall and having a bottom opening, the accumulator sheath region covering the accumulator except for the opening which exposes the bottom surface of the accumulator.

6. The hand-held tool according to claim 5, wherein the flexible sheath part further comprises base regions extending from the accumulator sheath region and configured to partially engaging under the accumulator.

7. The hand-held tool according to claim 6, wherein the handle region includes a recess, and the sheath part wall further comprises a protrusion on an inner side thereof for positive engagement with the recess.

8. The hand-held tool according to claim 7, wherein the protrusion is formed in one piece with the sheath part wall.

9. The hand-held tool according to claim 8, wherein the protrusion is formed of the same material as the sheath part wall.

10. The hand-held tool according to claim 1, wherein the handle region includes a recess, and the flexible sheath part further comprises a protrusion on an inner side of the sheath part wall for positive engagement with the recess.

11. The hand-held tool according to claim 10, wherein the protrusion is formed in one piece with the sheath part wall.

12. The hand-held tool according to claim 11, wherein the protrusion is formed of the same material as the sheath part wall.

13. The hand-held tool according to claim 10, further comprising an accumulator on the second end of the handle region, and the flexible sheath part further comprises base regions configured to partially engaging under the accumulator.

14. The hand-held tool according to claim 1,
   wherein the handle region has a longitudinal axis defined between the first and second ends thereof, and the handle region includes a recess; and
   wherein the flexible sheath part further includes an approximately sleeve-shaped protrusion on an inner side of the sheath part wall and which is configured to positively engage with the recess to protect against detachment of the flexible sheath part along the longitudinal axis.

15. The hand-held tool according to claim 14, wherein the approximately sleeve-shaped protrusion is formed in one piece with the sheath part wall.

16. The hand-held tool according to claim 15, wherein the approximately sleeve-shaped protrusion is formed of the same material as the sheath part wall.

17. The hand-held tool according to claim 1,
   further comprising an accumulator at the second end, the accumulator having a bottom surface; and
   wherein the flexible sheath part further includes an accumulator sheath region extending from the second end of the sheath part wall and having an open second end formed by an opening, wherein the bottom surface of the accumulator is exposed through the opening during operation of the hand-held tool.

18. The hand-held tool according to claim 17, wherein the flexible sheath part further comprises base regions extending from the accumulator sheath region and configured to partially engage under the accumulator.

19. The hand-held tool according to claim 18, wherein the handle region includes a recess, and the sheath part wall has a protrusion on an inner side thereof for positive engagement with the recess.

20. The hand-held tool according to claim 18, wherein the handle region forms part of a housing formed of plastic hard parts and the flexible sheath part provides a closed cover for the housing.

* * * * *